US010353206B2

United States Patent
Guo et al.

(10) Patent No.: US 10,353,206 B2
(45) Date of Patent: Jul. 16, 2019

(54) ADJUSTABLE HEAD-MOUNTED DISPLAY

(71) Applicant: Qingdao GoerTek Technology Co., Ltd., Qingdao (CN)

(72) Inventors: Ning Guo, Qingdao (CN); Xiaodong Li, Qingdao (CN); Ke Li, Qingdao (CN)

(73) Assignee: Qingdao GoerTek Technology Co., Ltd., Qingdao (CN)

( * ) Notice: Subject to any disclaimer, the term of this patent is extended or adjusted under 35 U.S.C. 154(b) by 138 days.

(21) Appl. No.: 15/539,969

(22) PCT Filed: Dec. 16, 2015

(86) PCT No.: PCT/CN2015/097613
§ 371 (c)(1),
(2) Date: Jun. 26, 2017

(87) PCT Pub. No.: WO2016/107419
PCT Pub. Date: Jul. 7, 2016

(65) Prior Publication Data
US 2018/0003986 A1    Jan. 4, 2018

(30) Foreign Application Priority Data

Dec. 31, 2014  (CN) .......................... 2014 1 0846510

(51) Int. Cl.
G02B 27/01    (2006.01)
H04R 1/10    (2006.01)
H04R 5/033    (2006.01)

(52) U.S. Cl.
CPC ....... *G02B 27/0176* (2013.01); *H04R 1/1008* (2013.01); *H04R 5/0335* (2013.01); *H04R 1/1066* (2013.01); *H04R 2499/15* (2013.01)

(58) Field of Classification Search
CPC .. G02B 27/01; G02B 27/017; G02B 27/0176; H04R 1/1008; H04R 5/0335; H04R 1/1066; H04R 2499/15
See application file for complete search history.

(56) References Cited

U.S. PATENT DOCUMENTS 3,848,974 A * 11/1974 Hosking ............ G02B 27/0101
345/7
4,455,457 A    6/1984 Akira
(Continued)

FOREIGN PATENT DOCUMENTS

CN    102918443    2/2013
CN    103591414    2/2014
(Continued)

OTHER PUBLICATIONS

Office Action from corresponding Chinese Application No. 201410846510.0 dated Jun. 2, 2016 (7 pages).
(Continued)

*Primary Examiner* — Robert J Michaud
(74) *Attorney, Agent, or Firm* — Harness, Dickey & Pierce, P.L.C.

(57) ABSTRACT

An adjustable head-mounted display comprises a head-mounted portion (1), a display portion (2) and a sound outputting portion (3). The display portion (2) comprises two legs (21) and a display (22), one end of each leg (21) is connected to corresponding end of the display (22), and the other end of each leg (21) is rotatably connected to an end of the head-mounted portion (1) on corresponding side. The sound outputting portion (3) comprises a left headphone and a right headphone, wherein the left headphone and the right headphone each comprises an ear cup (32), an ear cup bracket and a sound generator in the ear cup. The ear cup bracket is connected to an end of the head-mounted portion (1) on corresponding side, and the ear cup is connected to the
(Continued)

ear cup bracket; and the head-mounted portion (1) is provided with a head-mounted portion length adjustment mechanism. By the present disclosure, the user can adjust the length upon his demand, and the universality will be improved.

19 Claims, 2 Drawing Sheets

(56) References Cited

U.S. PATENT DOCUMENTS

| | | | |
|---|---|---|---|
| 5,880,773 A * | 3/1999 | Suzuki | G02B 7/12 345/8 |
| 6,538,624 B1 | 3/2003 | Karasawa et al. | |
| 2005/0053255 A1 | 3/2005 | Harris et al. | |
| 2011/0194029 A1 | 8/2011 | Herrmann et al. | |
| 2012/0068914 A1 | 3/2012 | Jacobsen et al. | |
| 2014/0176398 A1 * | 6/2014 | West | G02B 27/0176 345/8 |
| 2015/0219901 A1 | 8/2015 | Morimoto | |

FOREIGN PATENT DOCUMENTS

| | | |
|---|---|---|
| CN | 203675276 | 6/2014 |
| CN | 203675286 | 6/2014 |
| CN | 104166239 | 11/2014 |
| CN | 104503086 | 4/2015 |
| CN | 204302575 | 4/2015 |
| EP | 0551781 A1 | 7/1993 |
| JP | H5191745 A | 7/1993 |
| JP | H10333078 A | 12/1998 |
| JP | 2008271054 | 11/2008 |
| JP | 200988607 A | 4/2009 |
| JP | 200933308 | 2/2012 |
| JP | 201468184 A | 4/2014 |
| TW | 307169 | 3/2007 |

OTHER PUBLICATIONS

Office Action from corresponding Chinese Application No. 201410846510.0 dated Dec. 15, 2016 (6 pages).
Written Opinion from corresponding PCT Application No. PCT/CN2015/097613 dated Feb. 24, 2016 (4 pages).

* cited by examiner

ADJUSTABLE HEAD-MOUNTED DISPLAY

TECHNICAL FIELD

The present disclosure relates to head-mounted displays, and particularly, an adjustable head-mounted display in which the display wearing length is adjustable.

BACKGROUND

The head-mounted display is a device that displays images and colors. Usually, it makes a display screen approach the user's eyes in the form of an eye patch or a helmet, and projects screens to the eyes in a short distance by adjusting the focal length through an optical path.

Nowadays, head-mounted displays emerge endlessly like mushrooms after rain. The head-mounted display generally includes a display portion, a head-mounted portion and a sound outputting portion. In the prior art, the head band of the head-mounted portion has a fixed length after the processing, and when being worn, it cannot be extended or shortened by the user according to his head circumference, so the universality is poor. In addition, the two legs of the display portion also have fixed lengths and cannot be adjusted. The sound generator in the sound outputting portion is fixedly connected to the corresponding end of the head-mounted portion, and cannot be rotated. If the user wants to put the head-mounted display into a storage box during traveling, the sides of the sound generators of two sound outputting portions that are contacted with the ears are not located in the same plane, so a large space is occupied and the storage is inconvenient, which cannot satisfy people's demand.

SUMMARY OF THE DISCLOSURE

Some embodiments of the present disclosure proposes an adjustable head-mounted display, comprising a head-mounted portion, a display portion and a sound outputting portion, wherein the display portion comprises two legs and a display, one end of each leg is connected to corresponding end of the display, and the other end of each leg is rotatably connected to an end of the head-mounted portion on corresponding side; the sound outputting portion comprises a left headphone and a right headphone, wherein the left headphone and the right headphone each comprises an ear cup, an ear cup bracket and a sound generator in the ear cup; the ear cup bracket is connected to an end of the head-mounted portion on corresponding side, and the ear cup is connected to the ear cup bracket, wherein the head-mounted portion is provided with a head-mounted portion length adjustment mechanism.

In some embodiments, the head-mounted portion length adjustment mechanism comprises a slide rod with a protrusion end, a first connection rod, and an elastic sheet with a downwardly bulging middle portion; an upper surface of the protrusion end is provided with a plurality of wavy protuberances, a first elongated slot is opened in the first connection rod, both ends of the elastic sheet are embedded into the first elongated slot, and the middle portion of the elastic sheet is bulged downwards and pressed into a recess between the wavy protuberances.

In some embodiments, the legs of the display portion are provided with a leg length adjustment mechanism.

In some embodiments, the leg length adjustment mechanism comprises a second connection rod, an extendable rod, a third connection rod connected to the display, and a spring; a second elongated slot is opened in the second connection rod; a third elongated slot is opened in the third connection rod; one end of the spring is connected to the extendable rod, and the other end of the spring is fixed in the second elongated slot or the third elongated slot; the other end of the extendable rod is correspondingly fixed in the third elongated slot or the second elongated slot; and an upper surface or a lower surface of the extendable rod is provided with plastic elastic protuberances.

In some embodiments, the ear cup bracket comprises an ear cup bracket fixing portion connected to the head-mounted portion, and an ear cup bracket rotation portion movably connected to the ear cup; and the ear cup bracket rotation portion and the ear cup bracket fixing portion are rotatably connected to each other around a vertical axis.

In some embodiments, a first blind hole is opened in the ear cup bracket fixing portion, a second blind hole is opened in the ear cup bracket rotation portion, and a rotation shaft is inserted into the first blind hole and the second blind hole, so as to realize a rotatable connection between the ear cup bracket rotation portion and the ear cup bracket fixing portion.

In some embodiments, the head-mounted portion is entirely made of a cambered bent strip.

In some embodiments, a front-back adjusting assembly is provided in the display portion to drive the display to move forward and backward; the front-back adjusting assembly comprises a threaded rod and a threaded knob; the threaded rod is fixedly connected to the display; and the threaded knob is in threaded connection with the threaded rod to drive the threaded rod to move forward or backward.

In some embodiments, the display portion comprises a display frame, a lens module and a supporting platform; an adjustment slot is opened in the display frame; the supporting platform is fixedly connected to the lens module; an adjustment block is provided below the supporting platform; and the adjustment block slides back and forth along the adjustment slot.

According to some embodiments of the present disclosure, by providing a head-mounted portion length adjustment mechanism on the head-mounted portion, the present disclosure realizes the adjustment of the head-mounted portion, overcomes the disadvantage of the prior art that the length cannot be adjusted, meets the demands of different people, and improves the universality. In addition, by providing a leg length adjustment mechanism, the leg length of the display portion can be adjusted, and the ear cup bracket fixing portion and the ear cup bracket rotation portion of the sound outputting portion are rotatably connected to each other, which meets the demand of multidirectional and multi-angle rotation of the ear cup and facilitates the storage.

BRIEF DESCRIPTION OF THE DRAWINGS

The drawings are intended to provide a further understanding of the present disclosure, and constitute part of the description. The drawings are intended to interpret the present disclosure along with the embodiments of the present disclosure, and do not function to limit the present disclosure. In the drawings.

DETAILED DESCRIPTION

Figure 1:
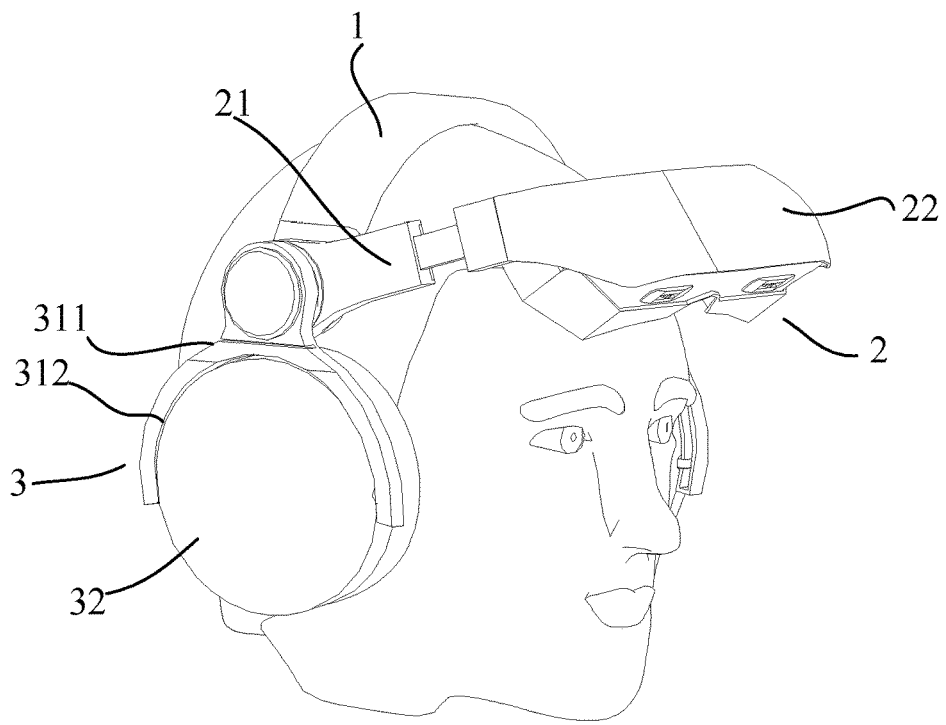
FIG. 1 is an entire structure diagram of an adjustable head-mounted display of some embodiments of the present disclosure.

In order to make the objects, the technical solutions and the advantages of the present disclosure clearer, the present disclosure will be described below in conjunction with the drawings.

Referring to FIGS. 1 to 4, an adjustable head-mounted display in some embodiments of the present disclosure comprises a head-mounted portion 1, a display portion 2 and a sound outputting portion 3; the display portion 2 comprises two legs 21 and a display 22, one end of each leg 21 is connected to corresponding end of the display 22, and the other end of each leg 21 is rotatably connected to an end of the head-mounted portion 1 on corresponding side; the sound outputting portion 3 comprises a left headphone and a right headphone, wherein the left headphone and the right headphone each comprises an ear cup 32, an ear cup bracket and a sound generator in the ear cup; the ear cup bracket is connected to an end of the head-mounted portion 1 on corresponding side, the ear cup 32 is connected to the ear cup bracket, and the head-mounted portion 1 is provided with a head-mounted portion length adjustment mechanism.

Figure 2:
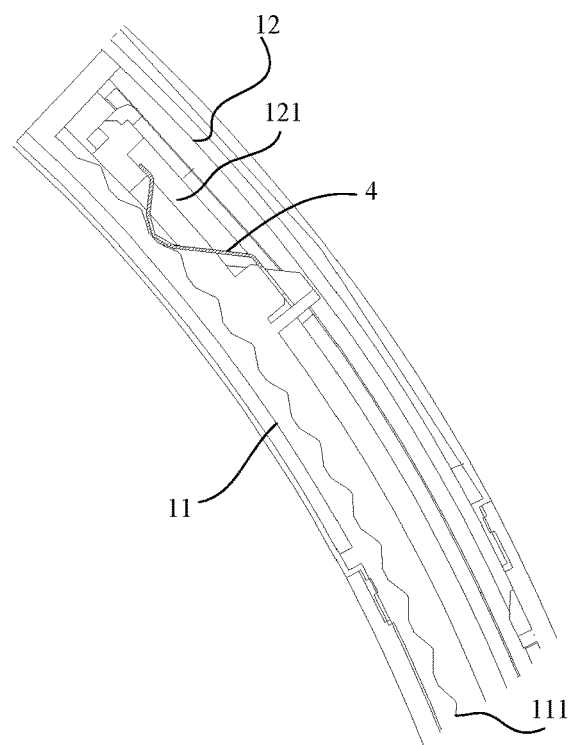
FIG. 2 is a structure diagram of a head-mounted portion length adjustment mechanism of an adjustable head-mounted display of some embodiments of the present disclosure.

In some embodiments, two sets of the head-mounted portion length adjustment mechanisms are symmetrically connected to two ends of the body of the head-mounted portion 1, respectively, so as to achieve the adjustment of the length of the head-mounted portion 1. Referring to FIG. 2, the head-mounted portion length adjustment mechanism in the embodiment comprises a slide rod 11 with a protrusion end, a first connection rod 12, and an elastic sheet 4 with a downwardly bulging middle portion; an upper surface of the protrusion end is provided with a plurality of wavy protuberances 111, a first elongated slot 121 is opened in the first connection rod 12, both ends of the elastic sheet 4 are embedded into the first elongated slot 121, and the middle portion of the elastic sheet 4 is bulged downwards and pressed into a recess between the wavy protuberances 111. During the adjustment, a person applies a large force to push the protrusion end to overcome the resistance of the elastic sheet 4 and slide forward or backward. When the person stops the force application, the wavy protuberance 111 of the protrusion end cannot move forward or backward due to the resistance of the elastic sheet 4, and then clamped by the elastic sheet 4 to realize a clamping positioning. Of course, the elastic sheet 4 in the embodiment can also be replaced by an elastic block provided on the upper surface of the first elongated slot 121, which also achieves the effect of sliding and post-slide clamping.

Figure 3:
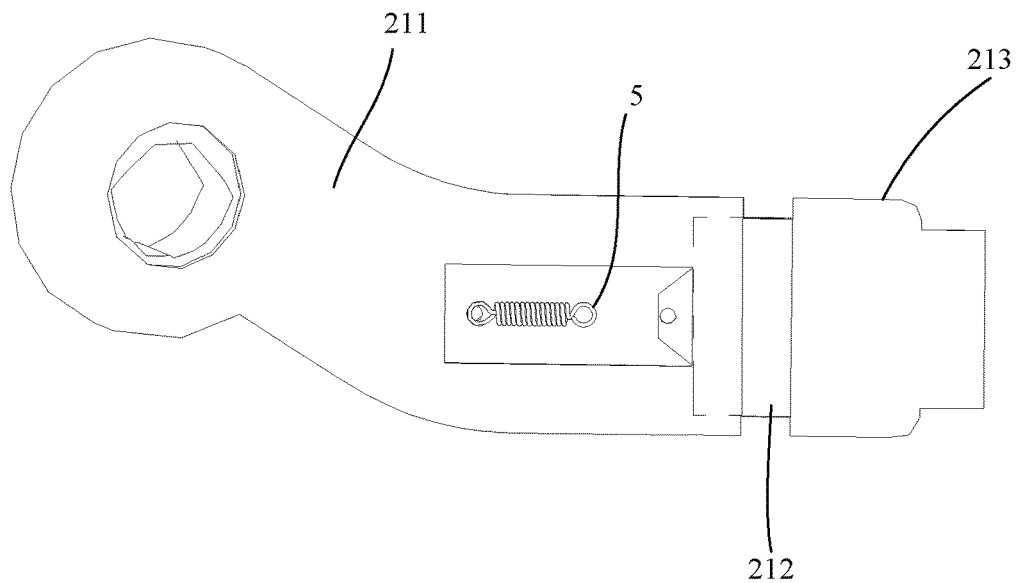
FIG. 3 is a structure diagram of a leg length adjustment mechanism of an adjustable head-mounted display of some embodiments of the present disclosure.
Figure 4:
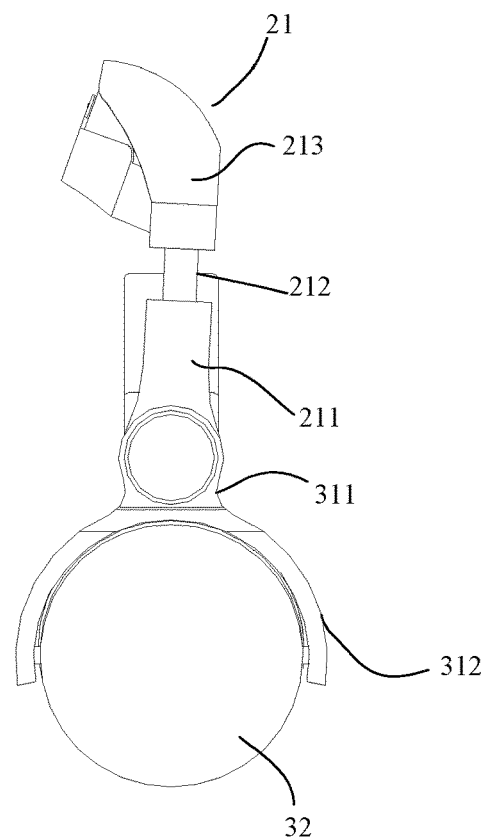
FIG. 4 is a structure diagram of an adjustable head-mounted display of some embodiments of the present disclosure after an ear cup of a sound outputting portion is rotated by 90 degrees.

In some embodiments, the display leg 21 is provided with a leg length adjustment mechanism. Referring to FIGS. 3 and 4, the bodies of the two legs 21 connected to the two ends of the display 22 are provided with a leg length adjustment mechanism, respectively, so as to adjust the lengths of the two legs 21. The leg length adjustment mechanism comprises a second connection rod 211, an extendable rod 212, a third connection rod 213 connected to the display 22 and a spring 5. A second elongated slot is opened in the second connection rod 211; a third elongated slot is opened in the third connection rod 213; one end of the spring 5 is connected to the extendable rod 212, and the other end of the spring 5 is fixed in the second elongated slot or the third elongated slot; the other end of the extendable rod 212 is correspondingly fixed in the third elongated slot or the second elongated slot; and the upper surface or the lower surface of the extendable rod 212 is provided with plastic elastic protuberances.

During the adjustment, a person may push or pull the extendable rod 212 to continuously compress or stretch the spring 5 to change the length. The upper surface or the lower surface of the extendable rod 212 is provided with plastic elastic protuberances, so that a person can easily overcome the resistance of the extendable rod 212 to adjust the length. When the length is changed to reach an appropriate position, the person releases his hand, and the extendable rod 212 is correspondingly clamped outside the elongated slot by the external plastic elastic protuberances to realize the positioning, thereby meeting people's requirement on wearing comfort.

Referring to FIGS. 1 and 4, in some embodiments, the ear cup bracket comprises an ear cup bracket fixing portion 311 connected to the head-mounted portion 1, and an ear cup bracket rotation portion 312 moveably connected to the ear cup 32, wherein the ear cup bracket rotation portion 312 and the ear cup bracket fixing portion 311 are rotatably connected to each other around a vertical axis.

In order to make the ear cup bracket rotation portion 312 and the ear cup bracket fixing portion 311 rotate around the same vertical axis, a first blind hole is opened in the ear cup bracket fixing portion 311, a second blind hole is opened in the ear cup bracket rotation portion 312, and a rotation shaft is inserted into the first blind hole and the second blind hole, so as to realize the rotatable connection between the ear cup bracket rotation portion 312 and the ear cup bracket fixing portion 311. Thus, the ear cup 32 and the sound generator therein can rotate around the axis in the vertical direction to realize the rotation in a plane. When a user wants to store the adjustable head-mounted display, he may rotate the ear cup 32 to an appropriate position according to his demands for a deposition. For example, in the existing adjustable head-mounted display, the ear cup 32 and the sound generator therein are mostly fixed rather than rotatable. During travel, it is difficult for people to put the head-mounted display into a suitcase and a large space will be occupied. However, if the head-mounted display of the embodiment is used, the two ear cups 32 can be rotated by 360 degrees around the vertical axis, and when an appropriate position is reached, the head-mounted display is put into the suitcase, which is convenient, efficient and space saving.

In some embodiments, the head-mounted portion 1 is entirely made of a cambered bent strip, which matches with the cambered head of the human body, thereby facilitating the wearing on the human body, and improving the wearing comfort.

In order to realize the refractive accommodation function when the adjustable head-mounted display is worn, a front-back adjusting assembly is provided in the display portion 2 to drive the display to move forward and backward. The refractive accommodation is mainly made by adjusting the distance between the lens module and the display. The lens module is generally fixed on the bracket, and thus the above distance is changed by adjusting the longitudinal separation of the display, so as to complete the refractive accommodation. The forward and backward movement of the display is mainly realized by the front-back adjusting assembly. In the embodiment, the front-back adjusting assembly mainly comprises a threaded rod and a threaded knob, wherein the threaded rod is fixedly connected to the display, and the threaded knob is in threaded connection with the threaded rod to drive the threaded rod to move forward and backward by the rotation of the threaded knob, thereby driving the display to move forward or backward to realize the refractive accommodation. In order to perform refractive accommodations for the two eyes corresponding to the two ends of the display, respectively, threaded knobs are symmetrically provided at the two sides of the bottom of the display to rotatably drive the display to move.

In some embodiments, the display portion 2 comprises a display frame, a lens module and a supporting platform, wherein an adjustment slot is opened in the display frame, the supporting platform is fixedly connected to the lens module, an adjustment block is provided below the supporting platform, the adjustment block slides back and forth along the adjustment slot, the adjustment block is connected to the supporting platform, and the lens module is fixed with the supporting platform, wherein when the adjustment block slides back and forth along the adjustment slot opened in the display frame, the lens module is driven to move, and the pupil distance between the two eyes can be adjusted by adjusting the adjustment blocks symmetrically provided at the two ends of the display portion 2 by sliding.

The above descriptions are some embodiments of the present disclosure, and are not limitations to the present disclosure. A person skilled in the art may change or modify the disclosed technical contents into equivalent embodiments. However, any contents that are not deviated from the technical solutions of the present disclosure, as well as any simple amendment or any equivalent change and modification made to the above embodiments according to the technical essence of the present disclosure, shall fall within the protection scope of the technical solutions of the present disclosure.

The invention claimed is:

1. An adjustable head-mounted display, comprising a head-mounted portion, a display portion and a sound outputting portion, wherein:
   the display portion comprises two legs and a display, one end of each leg is connected to a corresponding end of the display, and the other end of each leg is rotatably connected to an end of the head-mounted portion on a corresponding side;
   the sound outputting portion comprises a left headphone and a right headphone, each of the left headphone and the right headphone comprises an ear cup, an ear cup bracket and a sound generator in the ear cup, the ear cup bracket of said each of the left headphone and the right headphone is connected to an end of the head-mounted portion on a corresponding side, and the ear cup of said each of the left headphone and the right headphone is connected to its corresponding ear cup bracket;
   the head-mounted portion includes a head-mounted portion length adjustment mechanism having a slide rod with a protrusion end, a first connection rod, and an elastic sheet with a downwardly bulging middle portion; and
   the protrusion end includes an upper surface having a plurality of wavy protuberances, the first connection rod includes a first elongated slot, ends of the elastic sheet are embedded into the first elongated slot, and the middle portion of the elastic sheet is bulged downwards and pressed into a recess formed between two of the wavy protuberances.

2. The adjustable head-mounted display according to claim 1, wherein the legs of the display portion each include a leg length adjustment mechanism.

3. The adjustable head-mounted display according to claim 2, wherein the leg length adjustment mechanism comprising a second connection rod, an extendable rod, a third connection rod connected to the display, and a spring, wherein the second connection rod includes a second elongated slot, wherein the third connection rod includes a third elongated slot, wherein one end of the spring is connected to one end of the extendable rod, and the other end of the spring is fixed in the second elongated slot or the third elongated slot wherein the other end of the extendable rod is correspondingly fixed in the third elongated slot or the second elongated slot, and wherein an upper surface or a lower surface of the extendable rod includes plastic elastic protuberances.

4. The adjustable head-mounted display according to claim 1, wherein the ear cup bracket comprises an ear cup bracket fixing portion-connected to the head-mounted portion, and an ear cup bracket rotation portion movably connected to the ear cup, and wherein the ear cup bracket rotation portion and the ear cup bracket fixing portion are rotatably connected to each other around a vertical axis.

5. The adjustable head-mounted display according to claim 4, wherein the ear cup bracket fixing portion includes a first blind hole, the ear cup bracket rotation portion includes a second blind hole, and wherein the adjustable head-mounted display further comprises a rotation shaft inserted into the first blind hole and the second blind hole, so as to realize a rotatable connection between the ear cup bracket rotation portion and the ear cup bracket fixing portion.

6. The adjustable head-mounted display according to claim 1, wherein that the head-mounted portion is entirely made of a cambered bent strip.

7. The adjustable head-mounted display according to claim 6, further comprising a front-back adjusting assembly positioned in the display portion to drive the display to move forward and backward to realize refractive accommodation, the front-back adjusting assembly including a threaded rod and a threaded knob, the threaded rod fixedly connected to the display, and the threaded knob is in threadedly connected with the threaded rod to drive the threaded rod to move forward or backward.

8. The adjustable head-mounted display according to claim 7, wherein the display portion comprises a display frame, a lens module and a supporting platform, wherein the display frame includes an adjustment slot, wherein the supporting platform is fixedly connected to the lens module, wherein the adjustable head-mounted display further comprises an adjustment block positioned below the supporting platform, and wherein the adjustment block is configured to slide back and forth along the adjustment slot.

9. The adjustable head-mounted display according to claim 2, wherein that the head-mounted portion is entirely made of a cambered bent strip.

10. The adjustable head-mounted display according to claim 3, wherein that the head-mounted portion is entirely made of a cambered bent strip.

11. The adjustable head-mounted display according to claim 4, wherein that the head-mounted portion is entirely made of a cambered bent strip.

12. The adjustable head-mounted display according to claim 5, wherein that the head-mounted portion is entirely made of a cambered bent strip.

13. The adjustable head-mounted display according to claim 9, further comprising a front-back adjusting assembly positioned in the display portion to drive the display to move forward and backward to realize refractive accommodation, the front-back adjusting assembly including comprises a threaded rod and a threaded knob, the threaded rod fixedly connected to the display, and the threaded knob threadedly connected with the threaded rod to drive the threaded rod to move forward or backward.

14. The adjustable head-mounted display according to claim 10, further comprising a front-back adjusting assembly positioned in the display portion to drive the display to move forward and backward to realize refractive accommodation, the front-back adjusting assembly including a threaded rod and a threaded knob, the threaded rod fixedly connected to the display, and the threaded knob threadedly connected with the threaded rod to drive the threaded rod to move forward or backward.

15. The adjustable head-mounted display according to claim 11, further comprising a front-back adjusting assembly positioned in the display portion to drive the display to move forward and backward to realize refractive accommodation, the front-back adjusting assembly including a threaded rod and a threaded knob, the threaded rod fixedly connected to the display, and the threaded knob threadedly connected with the threaded rod to drive the threaded rod to move forward or backward.

16. The adjustable head-mounted display according to claim 12, further comprising a front-back adjusting assembly positioned in the display portion to drive the display to move forward and backward to realize refractive accommodation, the front-back adjusting assembly including a threaded rod and a threaded knob, the threaded rod fixedly connected to the display, and the threaded knob threadedly connected with the threaded rod to drive the threaded rod to move forward or backward.

17. The adjustable head-mounted display according to claim 13, wherein the display portion comprises a display frame, a lens module and a supporting platform, wherein the display frame includes an adjustment slot, wherein the supporting platform is fixedly connected to the lens module, wherein the adjustable head-mounted display further comprises an adjustment block positioned below the supporting platform, and wherein the adjustment block is configured to slide back and forth along the adjustment slot.

18. The adjustable head-mounted display according to claim 14, wherein the display portion comprises a display frame, a lens module and a supporting platform, wherein the display frame includes an adjustment slot, wherein the supporting platform is fixedly connected to the lens module, wherein the adjustable head-mounted display further comprises an adjustment block positioned below the supporting platform, and wherein the adjustment block is configured to slide back and forth along the adjustment slot.

19. The adjustable head-mounted display according to claim 16, wherein the display portion comprises a display frame, a lens module and a supporting platform, wherein the display frame includes an adjustment slot, wherein the supporting platform is fixedly connected to the lens module, wherein the adjustable head-mounted display further comprises an adjustment block positioned below the supporting platform, and wherein the adjustment block is configured to slide back and forth along the adjustment slot.

\* \* \* \* \*